United States Patent [19]

Foglia

[11] Patent Number: 5,157,531
[45] Date of Patent: Oct. 20, 1992

[54] HYBRID TRANSMISSION NETWORK
[75] Inventor: Henry R. Foglia, Raleigh, N.C.
[73] Assignee: International Business Machines Corporation, Armonk, N.Y.
[21] Appl. No.: 656,527
[22] Filed: Feb. 19, 1991
[51] Int. Cl.$^5$ .......................................... H04B 10/00
[52] U.S. Cl. .................................. 359/152; 359/118; 370/56; 375/11
[58] Field of Search ............... 359/118, 152, 179, 137, 359/120; 370/85.4, 56; 375/11

[56]  References Cited
U.S. PATENT DOCUMENTS

| | | | |
|---|---|---|---|
| 4,839,885 | 6/1989 | Wu | 359/120 |
| 4,839,886 | 6/1989 | Wu et al. | 359/120 |
| 4,979,167 | 12/1990 | McCool | 370/85.4 |

Primary Examiner—Edward L. Coles, Sr.
Assistant Examiner—Kinfe-Michael Negash
Attorney, Agent, or Firm—Joscelyn G. Cockburn

[57] ABSTRACT

A communications system including an optical communications channel, a wire distribution network and an interface assembly for coupling the optical communications channel to the wire distribution network. The interface assembly includes circuit arrangement having a transmitter section and a receiver section. The transmitter section receives high speed (say 100 mbits per sec) data signal from the optical channel, equalizes the data signal, reduces the signal amplitude, filters the common mode signal components and delivers the data signal to the wire distribution network. Data from the wire distribution network is filtered in the receiver section to remove common mode signal components, terminated, amplified and delivered to the optical channel. By doing all this, an optimum transmit signal is provided which best suits EMI requirements as well as a superior signal to noise response. The EMI characteristics of the system fall within the FTC guideline.

22 Claims, 8 Drawing Sheets

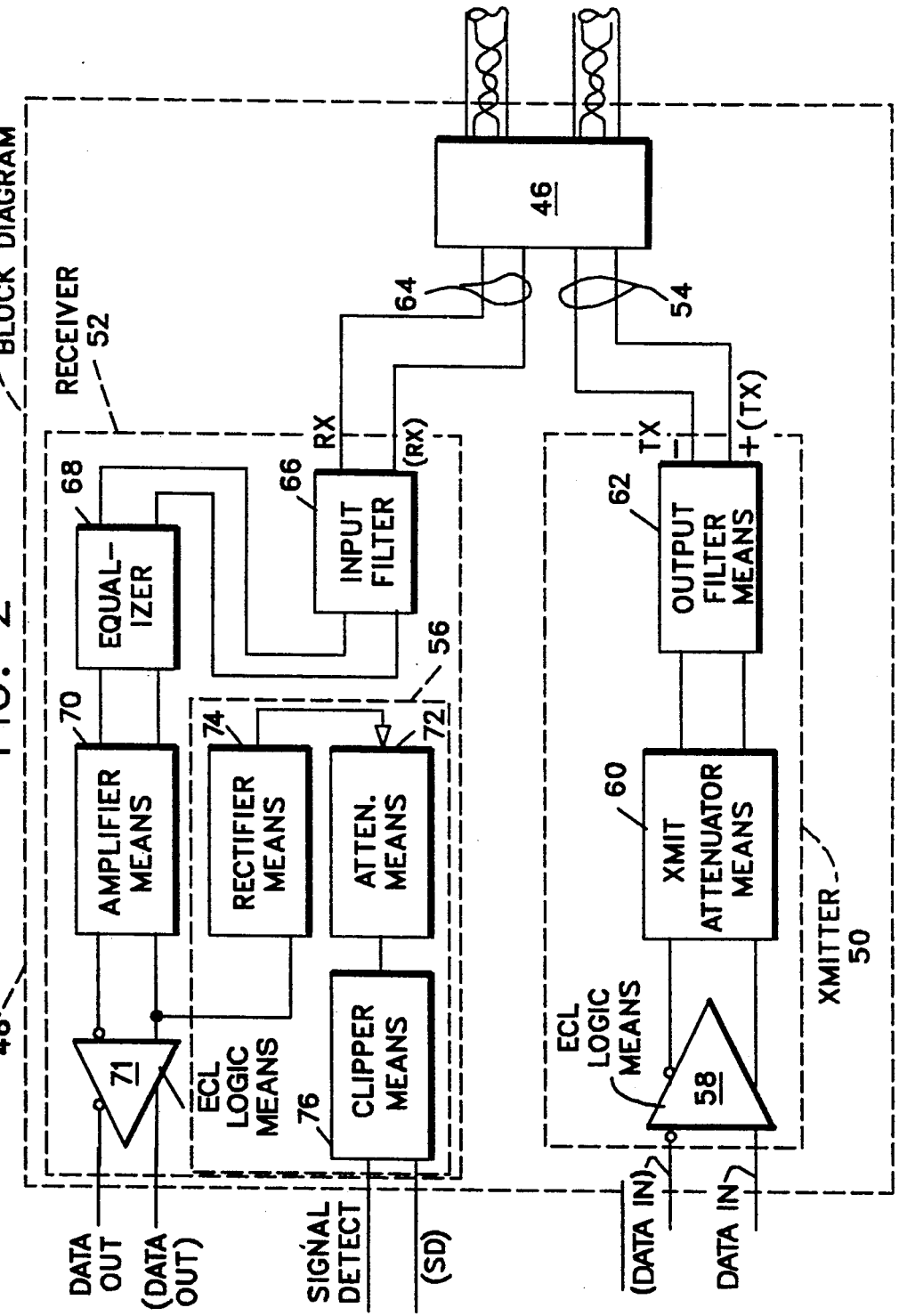

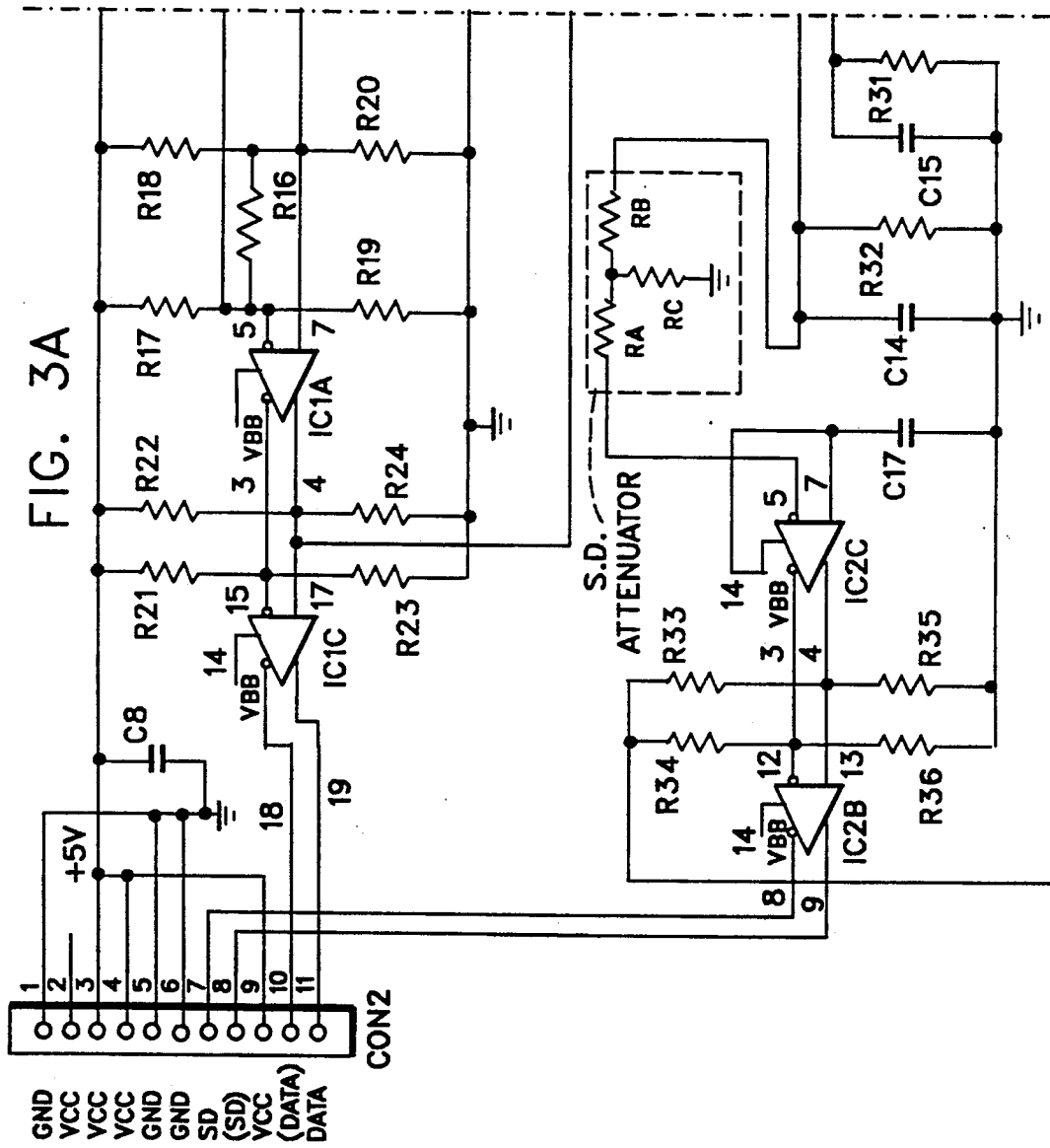

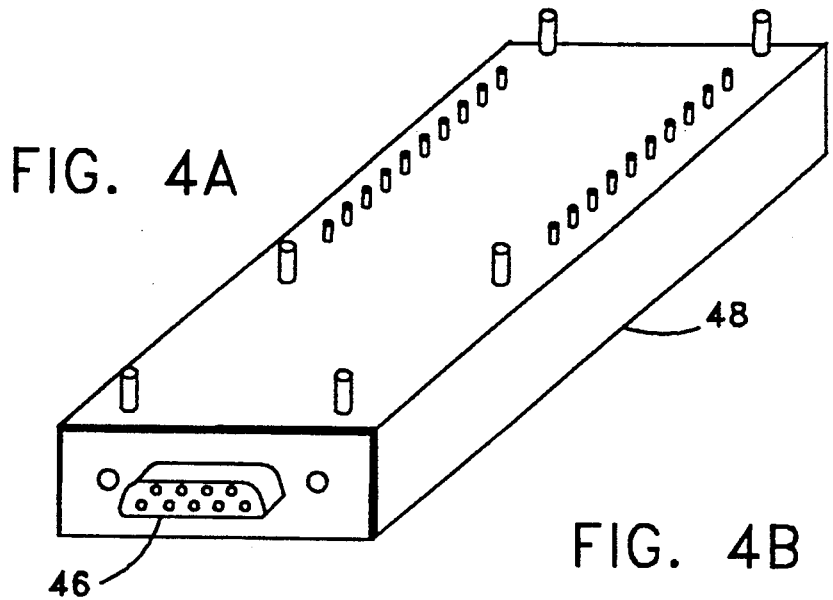
FIG. 4A
FIG. 4B
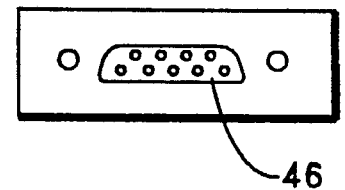
| | | | | |
|---|---|---|---|---|
| GND | ○ | | ○ | GND |
| DATA OUT | ○ 11 | | 12 ○ | DATA IN |
| (DATA) OUT | ○ 10 | | 13 ○ | (DATA) IN |
| VCC | ○ 9 | | 14 ○ | VBB |
| (SD) | ○ 8 | | 15 ○ | GND |
| SD | ○ 7 | | 16 ○ | GND |
| GND | ○ 6 | | 17 ○ | GND |
| GND | ○ 5 | | 18 ○ | VCC |
| VCC | ○ 4 | | 19 ○ | VCC |
| VCC | ○ 3 | | 20 ○ | VCC |
| VPD | ○ 2 | | 21 ○ | VCC |
| GND | ○ 1 | | 22 ○ | GND |
| GND | ○ | | ○ | GND |
| GND | ○ | | ○ | GND |
FIG. 4C

HYBRID TRANSMISSION NETWORK

BACKGROUND OF THE INVENTION

1. Field of the Invention

The present invention relates to communications systems in general and in particular to fiber optic/copper wire networks whose EMI characteristics meet Federal Trade Commission (FTC) standards.

2. Prior Art

The proliferation of personal computers, word processors and other data terminal equipment (DTE) has created a need for efficient communications highways to interconnect the DTE. Historically, electrical wires have been used to interconnect the devices. The use of electrical wires is acceptable provided that the data rate is less than say twenty m bits per sec. As the data rate exceeds the allowed maximum the wires and associated connectors and panels behave like transmitters to pollute the atmosphere with an undue amount of radiation which causes radio frequency interference and other types of EMI problems. The interference problem cannot be tolerated because most national governments set EMI standards, e.g., ANSI C63.4 for communication devices. The governments usually impose severe penalties on manufacturers whose devices violate the EMI standards. In severe cases a manufacturer can be forced to withdraw violating devices from the marketplace.

To circumvent the narrow bandwidth and EMI problems, the prior art has used fiber optic media for interconnecting the devices. Even though the fiber optic media solves the radiation and bandwidth problems, it too has inherent problems which must be dealt with in order to provide an adequate interconnecting network for interconnecting DTE. In the first instance, fiber optic media is expensive and difficult to tap in order to provide the large number of drops needed in a sequential multi-station network such as the IBM$^R$ Cabling System (ICS) used to interconnect the IBM Token Ring Local Area Network (LAN). Details of the ICS and LAN are set forth in IBM Technical Interface Spec. GA27-3773-0 and ANSI Standards TR-41.8.1 (SP-1907-B). The ANSI literature covers the standard for wiring commercial buildings. Due to the high cost associated with multi-drop configuration it is more expedient to use mixed media in which fiber optic is used for the backbone network and less expensive media such as wire drops to interconnect office outlets to the fiber optic backbone network. Stated another way, the distribution network from the office wall to the distribution panel or wiring closet (WC) is wire media while the backbone network between WC is fiber optic media. Other reasons for this combination are that wire is more terminally versatile than fiber and that wire may already be installed.

The mixed media transmission (fiber and wire) solution can also be used to address problems posed by pre-wired buildings. The owners of these buildings have significant assets invested in wiring the buildings and are very reluctant in pursuing a solution which requires the complete replacement of the wire with fiber optics. A more acceptable solution is to replace the backbone network with fiber communications media and reuse the pre-wired distribution network which is already present in the buildings.

The most significant problem which mixed media network poses is EMI which occurs in the wire distribution portion of the network. Acceptance of these networks will not occur until the EMI problems are solved.

A prior art patent, U.S. Pat. No. 4,809,361, describes an optical/electrical transceiver for interconnecting terminals to an optical fiber cable. U.S. Pat. No. 4,501,021 describes an optical-electrical interface (OEI) for coupling electrical cables supporting electrical devices to global optical cables. Neither of the prior art references address high speed data transmission on copper wire and the associated EMI problems.

SUMMARY OF THE INVENTION

It is, therefore, a general object of the invention to provide a communications network than has heretofore not been possible.

It is a more particular object to provide a fiber/wire communications network in which high speed data is transmitted without the network violating FTC or other governmental EMI guidelines.

The improved communications network includes an optical fiber cable, a wire distribution network and an interface unit interconnecting the distribution network to the optical fiber cable. The interface unit includes at least one circuit arrangement (transceiver) with a receiver section which receives data signals from an attached DTE and delivers them to the fiber cable and a transmitter section which receives data signals from the fiber cable and delivers them to the attached DTE. The transmitter and receiver are packaged as a single unit with a D-connector or the like to connect the transceiver with a DTE and a plurality of pins for mating with a planar or mother board.

The transmitter includes an equalizing network, an attenuating network and an output filtering network. The equalizing network receives electrical signals representative of high speed data from the optical fiber cable. The equalizing network includes an Emitter Coupled Logic (ECL) module which standardized the signal levels and switching speeds of the received signal. The amplitude of the standardized signal is next attenuated to a desired signal level by the attenuating network. The attenuated signal is next presented to the filtering network (a common mode transformer) which removes the common mode signal components while passing fast rise time pulses in order to preserve the high data rate.

The receiver includes a common mode transformer, a terminating network, an equalizing network and an amplifying network. The incoming signals from the wire distribution network is terminated by the terminating network. The common mode components in the incoming signals are suppressed by the common mode transformer. The balanced signal is passed through the equalizing network amplified and outputted from the transceiver, with virtually no penalty.

A thresholding circuit arrangement is provided on the transceiver to monitor the amplified balanced signal and outputs a control signal which is a logical "1" if valid data signals are outputted from the receiver section of the transceiver and a logical "0" if the data at the output of the receiver action is not valid. This feature makes the transceiver practically immune to spiked noise which may trigger a data output response. A fixed and dynamic thresholding circuit arrangement is also provided.

These and other objects and advantages of this invention will be more fully described in the accompanying drawings.

BRIEF DESCRIPTION OF THE DRAWINGS

FIG. 2 shows a block diagram of the transceiver module according to the teachings of the present invention.

FIGS. 3, 3A, 3B and 3C show a circuit schematic of the transceiver module.

FIGS. 4A, 4B and 4C show various views of the transceiver module.

DETAILED DESCRIPTION OF THE PREFERRED EMBODIMENT

Figure 1:
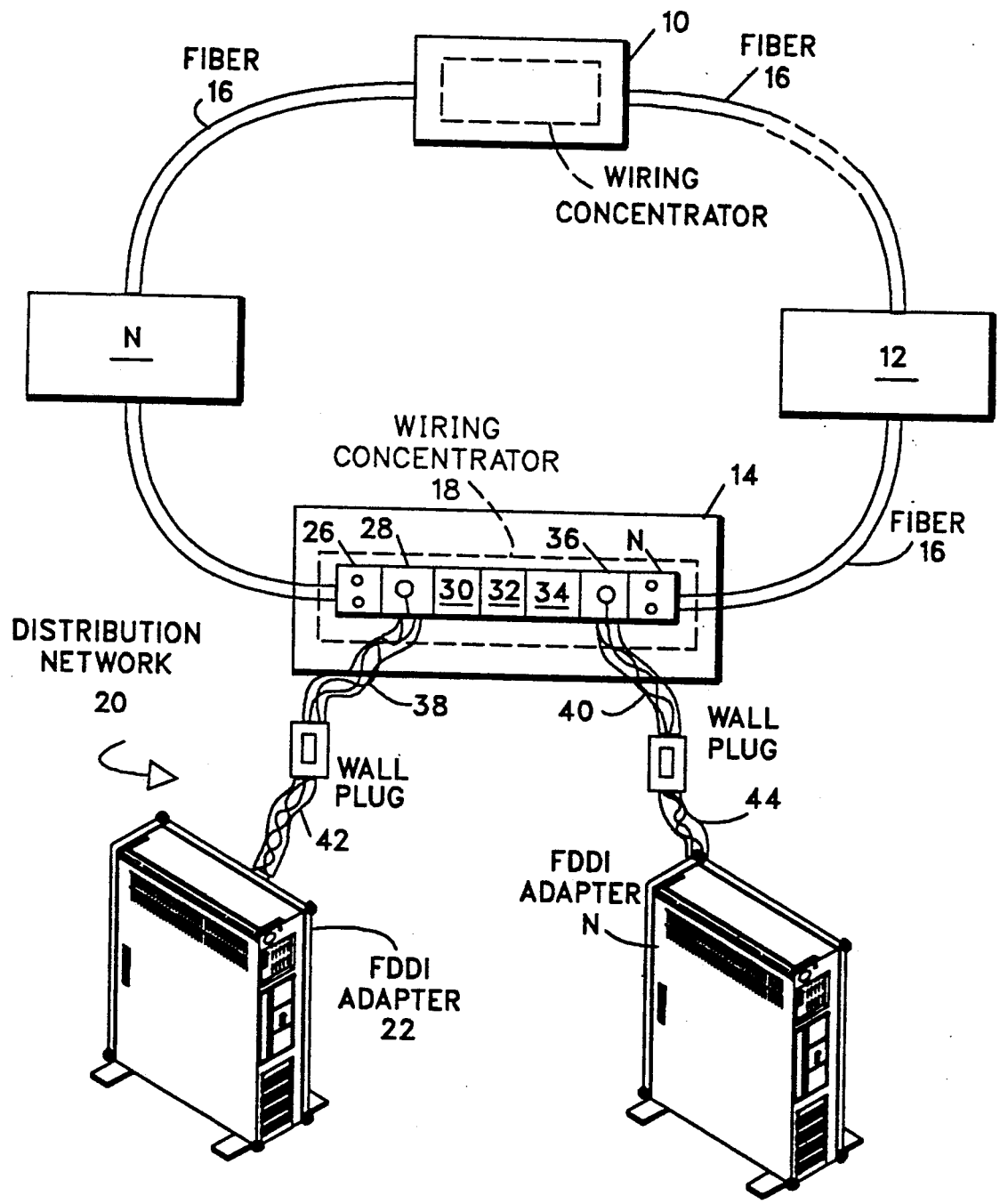
FIG. 1 shows a schematic of a communications system which embodies the teachings of the present invention.

FIG. 1 shows a communications system which embodies the teachings of the present invention. The communications system includes wiring closet (WC) 10, 12, 14 . . . n interconnected by an optical fiber transmission line 16. Each of the wiring closets includes at least a fiber optic distribution panel, a wiring concentrator module only one of which is shown in FIG. 1 and is identified by numeral 18 and a cable distribution panel. Each of the wiring concentrator (details to be given subsequently) is coupled by distribution networks, only one of which is shown, to personal computers (PC) such as those identified by numerals 22, . . . N. Each of the PCs includes an FDDI adapter for high speed data handling. A typical distribution network includes the cable distributor panel, the cables (such as 38, 40, 42 and 44) interconnecting the distributor panel to the PCs and the patch cables interconnecting the cable distributor panel to the wiring concentrator.

Still referring to FIG. 1, the wiring concentrator module 18 includes a planar mother board and a plurality of daughter cards, such as 26, 28, 30, 32, 34, 36 . . . n. The mother board has respective receptacles with holes for receiving the pins of each daughter card. As will be explained subsequently, a first one of the daughter cards such as 26 in each wiring concentrator converts optical signals to electrical signal which is passed to the other daughter card for distribution over the wire distribution network. The last daughter module such as n in each wiring concentrator converts electrical signals back to optical signal and forwards the optical signal onto the fiber optic link. This function provided by the end modules is similar to a function provided by the IBM 8228 multi-station access unit (MSAU). The wiring concentrator in each wiring closet (WC) and the interconnecting fiber transmission media form a looped backbone network which is identified by numeral 20 in FIG. 1. The fiber optic backbone network is a high speed network transmitting data at 100 mbits per sec.

Still referring to FIG. 1, each of the daughter cards positioned between the first and the last cards of each wiring concentrator, are identical and process electrical signals to be transmitted over the wire distribution network. Each of the daughter cards is connected by a wire cable from the wiring closet which is usually located at a selected point within the building to a wall plug in an office. Another wire cable interconnects the wall plug to a FDDI adapter (details to be given hereinafter) mounted in the PC (or other data terminal equipment) that sits on a desk in an office. With reference to FIG. 1, elements 38 and 40 show an example of interconnecting cables from the wiring closet to the wall plug in the office and numerals 42 and 44 show wire cable interconnecting the plug to the appropriate PCs. It should be noted that even though two cables are shown, in reality each concentrator carries a plurality of daughter cards and each daughter card has a separate cable connection to the PCs in the office. Therefore, if a wiring concentrator carries ten daughter cards, each one would have its separate wiring cable to the office. In other words, the number of cables is equivalent to the number of daughter cards in the wire concentrator.

In the preferred embodiment of this invention, the distribution network is identical to the IBM cabling system details of which is described in IBM Cabling System Technical Interface Specification and is incorporated herein by reference. As is described in the reference manual, each of the cables 38, 40, 44, 42 . . . n includes a pair of twisted copper wires only one of which is shown in the schematic. One of the copper wires transmits signals from the daughter module to the PC in the office and the other twisted pair wire carriers the signal from the PC to the daughter card. There is a daughter card in each PS/2 as well as in wiring concentrator.

The described communication system provides data transmission of 100 Mbit per sec. Data transmission at this high speed is intended to be transmitted on a FDDI network which is a pure fiber optic network described in ANSI ® X13.148 for FDDI Network. However, by designing each of the daughter modules in accordance with the teachings of the present invention, applicant provides a mixed communication network formed from fiber and copper wiring and was not available prior to applicant's invention because it is believed that the EMI problems caused by the wiring section of the network could not be contained to meet the requirement of FCC and other governmental guidelines.

Still referring to FIG. 1, the wiring closets and fiber optic transmission line forms a looped background network. As such, direction of data transmission on the ring is unidirectional and the ring signals are completed when the last copper signal port in the wiring concentrator is converted back to optical energy and transmitted over the optical fiber into the next wire concentrator.

Before describing the details of the daughter card (hereinafter called a transceiver), a summary of the theory upon which the invention is based is given. Radiation and therefore EMI is directly proportional to amplitude signal rise time and the amount of common mode signal components. Since rise time is determined by data rate desired, the disclosed technique uses reduced amplitude of approximately 300 mv (P-P) and a balanced signal via a common mode transformer (to be described subsequently).

The radiation results from the sum total of radiation from data conductor, distribution rack, cables, etc., signal amplitude and unbalanced signals. The radiated E field is comprised of a difference mode radiation and a common mode radiation. According to the textbook "Noise Reduction Techniques in Electronic Systems," 2nd Ed. by Henry W. Ott, 1988 (J. Wiley & Sons), the difference mode radiation ($E_D$) can be expressed as $$E_D = 263 \times 10^{-16} (f^2 A) I_D / r$$

where $(263 \times 10^{-16})$ represents a space factor constant; f represents the frequency of the signal; A represents the area of the loop formed by the difference signal current; $I_D$ represents the balance signal current and r represents the distance from the radiating device to the instrument measuring the radiation.

The common mode radiation ($E_C$) can be expressed as $$E_C = 12.6 \times 10^{-7} (fL) I_C / r$$

where L represents the length of the connecting cable, $I_c$ represents the common mode current; r represents the distance from the radiating device to the measuring instrument; f represents the frequency of the signal and $(12.6 \times 10^{-7})$ represents a space factor constant. Since the space factor constant for the common mode radiation ($E_C$) is much larger than the space factor constant for the difference mode radiation ($E_D$), the common mode radiation is stronger and of greater concern. It should also be noted that the common mode current ($I_C$) is proportional to the amount of imbalance and the magnitude of the signal amplitude. Therefore, by limiting the current I created by the 300 mvolts across 150 ohm cable, the radiation is reduced to an acceptable level. In addition, the E field is also reduced by limiting the amount of common mode components of the signal transmitted over the cable.

FIG. 2 shows a functional block diagram of a daughter card such as 26, etc. The daughter card includes a connector block 46 mounted on housing 48 which covers the component of the daughter card. The components of the daughter card are mounted on a planar support member.

Turning to FIGS. 4A, 4B and 4C for the moment, the physical packaging for each daughter card hereinafter referred to as a transceiver module is shown. In FIG. 4A the pins which mate with respective receptacles on the mother board are shown protruding from the under side of the planar support member. The connector 46 is shown mounted to the side of housing 48. As will be explained subsequently the connector 46 interfaces the transceiver to the IBM cabling system. FIG. 4B shows the mechanical details of connector 46. In the preferred embodiment of the invention connector 46 is a nine-pin D-connector fabricated by Amp® part number 745781-4 or its equivalent. FIG. 4C shows a bottom view of the transceiver module and the signals which are present on each of the output pins.

Referring again to FIG. 2, the transceiver includes a transmitter section 50 and a receiver section 52. The transmitter is connected by wire to the connector 46. The transmitter receives input data (both in phase and out of phase), processes the data and delivers it to copper wire 54. Likewise, signals from a PC are received at the receiver over the receive copper wires 64. The received signal is processed by receiver 52 and outputted as data to the mother board. Both the in-phase and out of phase components of the data signal is outputted from the receiver portion of the transceiver.

In addition, a portion of the receive signal is used by signal detect logic means 56 to generate signal detect (SD) signal which is transmitted in both the in and out of phase component to be used elsewhere. As will be described subsequently, the SD signal is used to gate the data out signal. This is necessary because the signals are very small after the transmitted 300 millivolts is cable attenuated and without generating the signal detect gating signal, noise which may trigger the data line could be inadvertently processed as data. However, by providing the signal detect signal which is high when good signal data is on the output data line, this unacceptable situation is eliminated.

Still referring to FIG. 2, the D-shell connector 46 interconnects the transceiver which is housed in the common housing 48 to the IBM cabling system. Therefore, signals from the transmitter are fed over one set of the twisted pair conductors in a single cable to a PC in an office. Similarly, data from the PC is fed over the over twisted pair wires in the same cable to connector 46 and is processed by the receiver 52. The transmitter 50 includes ECL logic means 58, transmit attenuating means 60 and output filter means 62. The ECL logic means 58 receives the input data signal and processes it so that the output levels and switching speed are standardized. The transmit attenuator means attenuate the signal to a predetermined level, thus minimizing radiation. In the preferred embodiment of this invention, the signal is attenuated to 300 millivolts, peak to peak and properly capacitively compensated to produce a square transmit pulse to the twisted pair cable.

Figure 5:
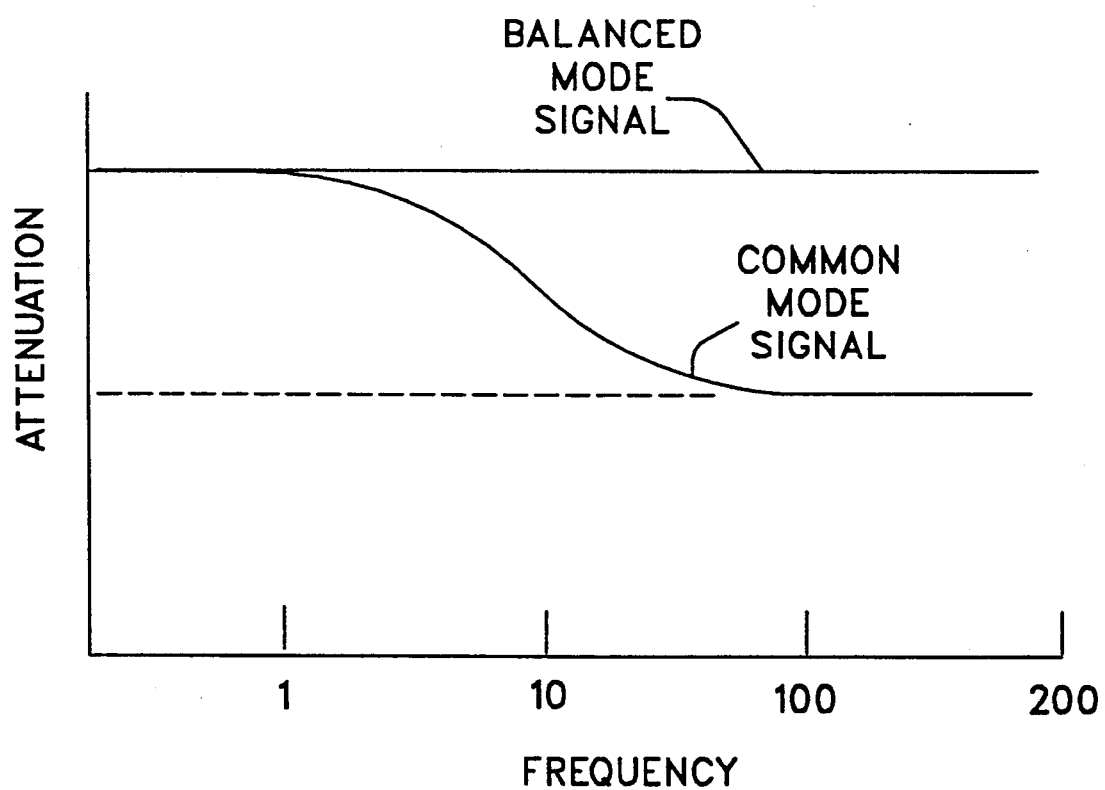
FIG. 5 shows a graphical representation of the attenuation characteristics of the common mode transformer.

The attenuated signal is next applied to the output filter means 62. The output filter means 62 is a wide band common mode transformer which attenuates common mode signal components while passing fast rise pulses in order to preserve the high data rates. The output filter means 62 also balances the signal on the twisted pair conductor 54. By balancing the signal and suppressing the common mode components, the radiation from transmission line 54 and other components of the system is reduced to acceptable EMI limits. Turning to FIG. 5 for the moment, the attenuation characteristics of the transformer is shown. The frequency range of the signal is shown on the horizontal axis and the attenuation is shown on the vertical axis. The curve labeled balanced mode signal is a representation of how much attenuation is experienced in the balanced mode signal. As is evident from the graph, the attenuation in the balanced mode signals is negligible. Alternately, the attenuation in the common mode signal is very large. Therefore, this indicates that by using a transformer having the characteristics of FIg. 5, the common mode signal which is the noise or radiating component of the transceiver is attenuated while the balance mode signal which carries the high speed data is transmitted unimpeded on the twisted pair conductor.

Still referring to FIG. 2, the receiver 52 includes input filter means 66, equalizer terminating means 68 and amplifier means 70. The input filtering means 66 is connected by twisted pair conductor 64 to the D shell connector 46. The function which the input filter means 66 performs to the receive signal is identical to the function which the output filter means 62 performs to the outgoing signals. In essence, the input filter means 66 removes the common mode signal which causes radiation and balances the high speed signals and outputs them to equalizer terminating means 68. The equalizer terminating means 68 adjusts and terminates the receiving signal to compensate for signal distortions created by lengths of cables interconnecting the wiring closet to a remote PC. It should be noted that the shielded twisted pair cable 38, 40 (FIG. 1) has high frequency losses which, in turn, contribute to its low pass filtering. Moreover, it is proportional to its length so that at maximum length it is at its lowest frequency.

A single fixed high frequency peaking equalizer can be used to compensate effectively (at a single length) and hence, it is set to a maximum length of say 100 meters. If the performance can be met at 100 meters, the overall compensation for shorter lengths can be tolerated because of the ECL response characteristic. In the transmit section of the transceiver, the equalizing function is combined with the transmitter attenuator capacitor (see FIG. 3B). Furthermore, since the transmitter output (attenuator, filters and cable) to the input of the amplifier are linear elements, then this equalizer can be placed just as well at the receiver input end. The advantage is that a well defined square transmitter pulse can be defined and standardized easily. The amplifying means 70 in FIG. 2 amplifies signals received from the equalizer, the ECL logic means 71 restores the received signal to standard ECL amplitude and drive capability and forwards the signal as data out.

Still referring to FIG. 2, signal detect generating means 56 provides a thresholding function and generates the signal detect (SD) control signals. The signal detect control pulses are used to gate data out. The signal detect generating means 56 includes an attenuation means 72, rectifier means 74 and clipper means 76. The attenuation is set by circuits in the attenuation means 72. The rectifier means 74 rectifies the output signal and the clipper means 76 provide the signal at an ECL level for driving off the module. The signal detect generating means 56 includes a fixed value attenuator and depending on its setting responds to the data signal outputted from the amplifier means. Thus, if the signal detect generating means is set to respond to signals above 20 millivolts, then any spiked noise which may trigger data output response is considered invalid if its average value is below 20 millivolts. This provides noise separation from valid data. This feature is very important in a noisy environment where the valid data is very small within the millivolt range. The highest signal digital response is, of course, limited to a value close to the minimum signal available which occurs for maximum cable distance.

Figures 3, 3B:
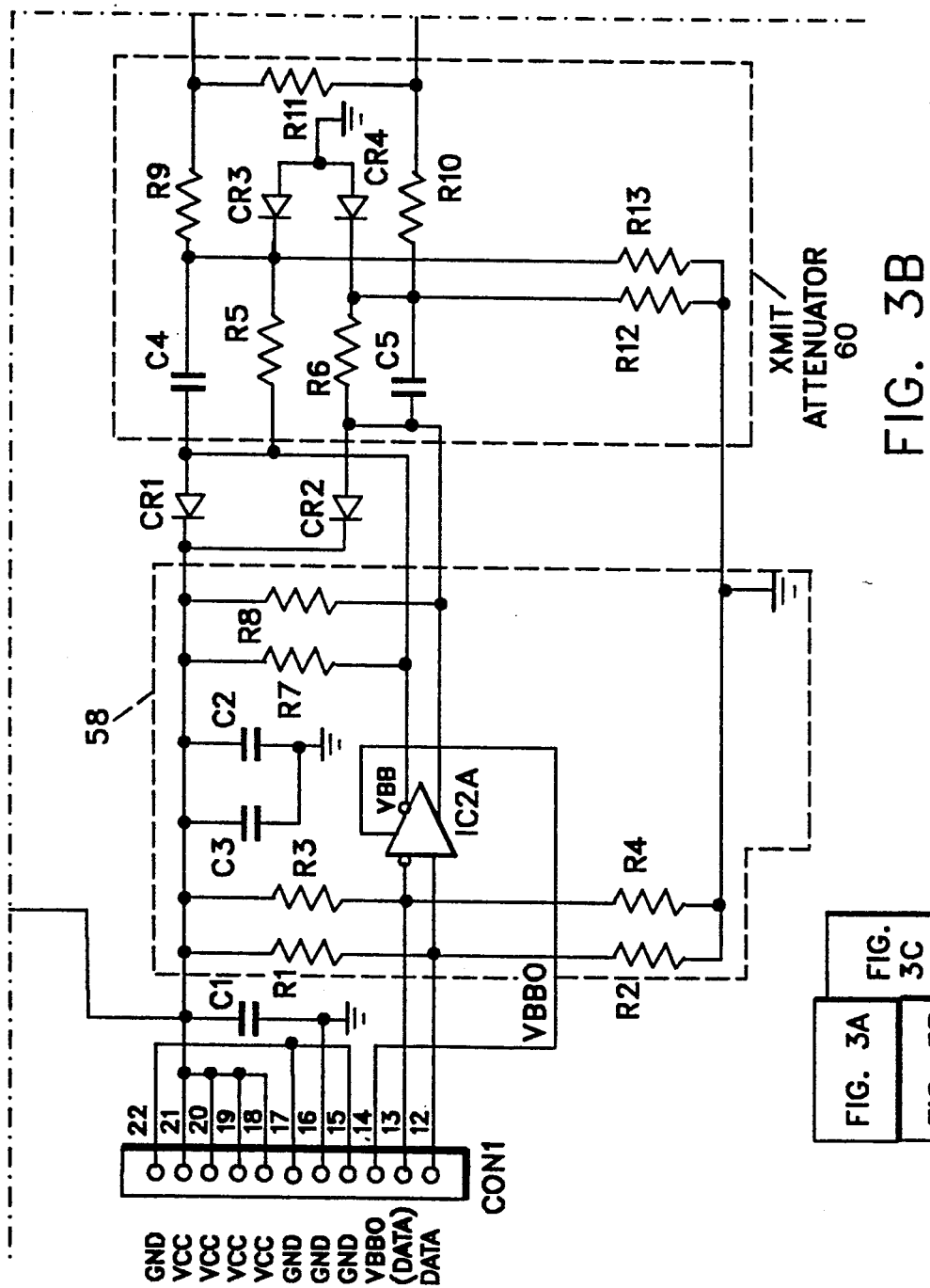
Figure 3C:
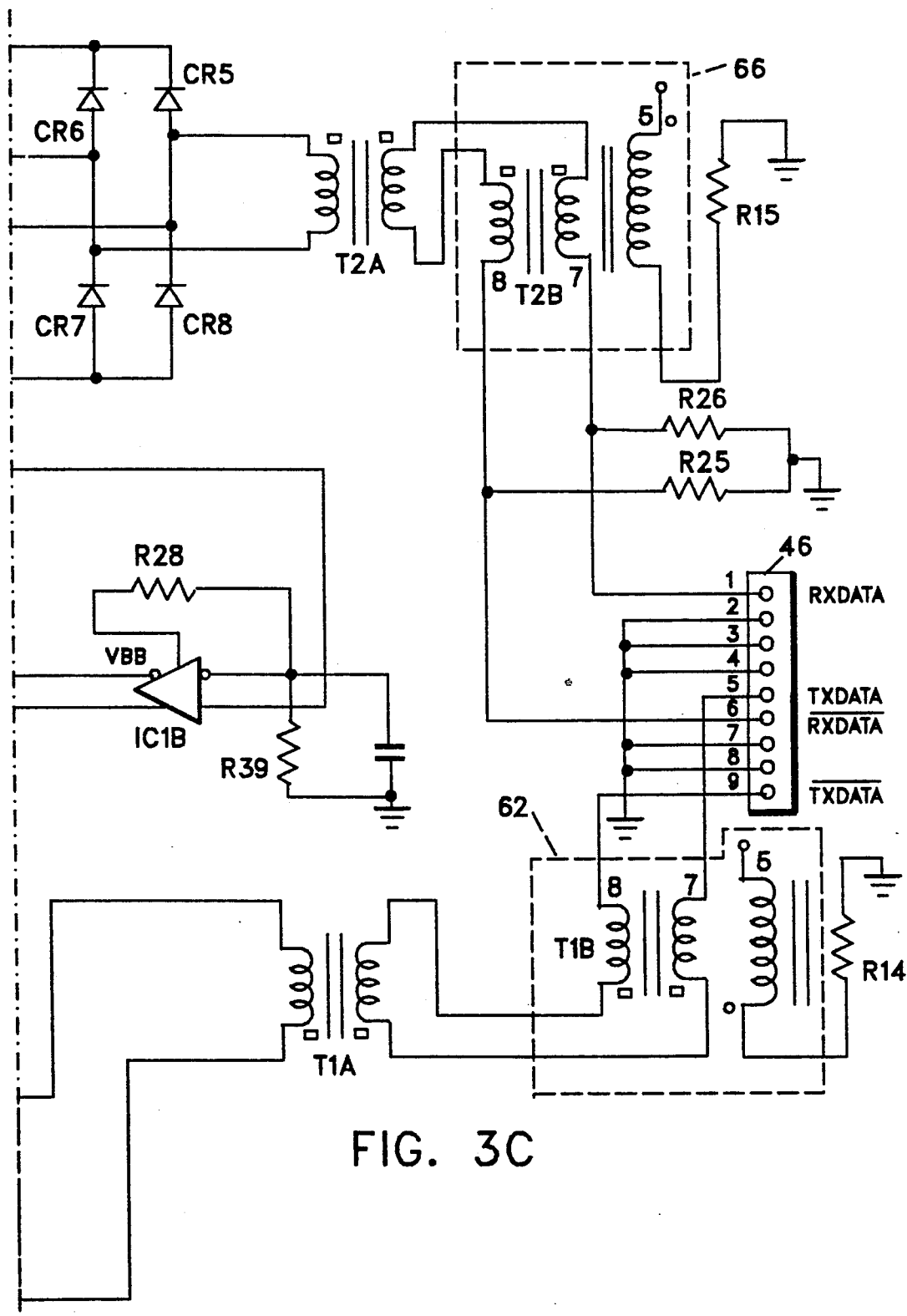

FIGS. 3A, 3B and 3C show a detailed circuit schematic of the transceiver whose block diagram is shown in FIG. 2. Each functional block is circled with broken lines and is identified by the same numerals as their counterpart in FIG. 2. The detailed components in each of the functional blocks and how they are interconnected is shown in the figure. For brevity, each component and how they are interconnected will not be recited. However, Table I below gives appropriate value for named components in FIGS. 3A, 3B and 3C. Also, elements or components which are off-the-shelf items will be identified accordingly. To this end, the pins of connector 46 (FIG. 3C) which are connected to respective conductors from the transmit and receive portion of the connector are shown. Likewise, connector 1 and connector 2 show the respective pins which are outputted from the transceiver modules and the signals which are available on these pins. As stated previously, these pins mate with similar receptacles on the mother board of each transceiver modules. The modules labeled IC1C, IC1A, IC2B, IC2C, IC1B, and IC2A are off-the-shelf items which perform ECL and amplifying functions. A plurality of common available modules such as the Motorola ® module part no. MC10H116FN or a similar module can be used to provide the ECL and amplifying function.

TABLE I

| Components | Value | Components | Value |
| --- | --- | --- | --- |
| C1 | 1.0 | R17 | 1.30k ohms |
| R1 | 825 ohms | R18 | 1.30k ohms |
| R2 | 1.30k ohms | R19 | 3.65k ohms |
| R3 | 825 ohms | R20 | 3.65k ohms |
| R4 | 1.30k ohms | R21 | 82.5 ohms |
| C2 | 0.1 | R22 | 82.5 ohms |
| C3 | 0.1 | R23 | 130 ohms |
| R5 | 105 ohms | R24 | 130 ohms |
| R6 | 105 ohms | R28 | 348 ohms |
| R7 | 82.5 ohms | R31 | 10k ohms |
| R8 | 82.5 ohms | R32 | 10k ohms |
| R9 | 124 ohms | R39 | 9.09k ohms |
| R10 | 124 ohms | R33 | 82.5 ohms |
| R12 | 24.9 ohms | R34 | 82.5 ohms |
| R13 | 24.9 ohms | R35 | 130 ohms |
| R14 | 36.0 ohms | R36 | 130 ohms |
| C4 | 22.0 pf | C8 | 1.0 |
| C5 | 22.0 pf | C9 | 0.033 |
| R15 | 36 ohms | C15 | 150 pf |
| R16 | 150 ohms | C14 | 150 pf |
| R25 | 1.5k ohms | C17 | 0.1 |
| R26 | 1.5k ohms | | |

Still referring to FIGS. 3A, 3B and 3C and in particular to the receiver section, receive data is provided on pins 1 and 6. The data is fed to the wide band transformer of the input filter through the EMI common mode filter and terminates in 150 ohm, a divider biasing circuit and discharge network (R25 R26) to input of ECL receiver circuit IC1A. This circuit serves as the first linear amplifier for these small signals which, in turn, feeds a second ECL circuit module IC1C for generating bonafide ECL level signals which are provided on pins 10 and 11. A portion of the amplifier signal is fed into a single stage of dual rectification caused by IC1B and resistance/capacitance loading on the output emitters of IC1B. The capacitors C14, C15 and the ten ohm resistors R31 and R32 provide a 1.5 microsecond time constant. This partial rectified signal is translated into ECL level via a fixed resistance attenuator $R_aR_bR_c$, the last stages IC2C and IC2B which provides the signal SD and not SD on pins 8 and 9 of the footprint.

Still referring to FIGS. 3A, 3B and 3C, the transmitter section of the transceiver receives data on pins 12 and 13. The ECL level of the signal is set by IC2A and is fed to combination attenuator and high frequency peaking equalizer formed by C4 and C5 which have a time constant of 2.2 nanoseconds. The transmit attenuator combination provides 150 ohm termination into output filter transformer combo and to output D-shell pins 5 and 9. This attenuator sets the critical value of amplitude to minimize EMI radiation.

Still referring to FIGS. 3A, 3B and 3C, the output filter means and the input filter means are identical. In the output transformer, the set of windings 5, 7, 8 form a very wide band EMI common mode "choke". The combination of a straight transformer (used mainly for serge suppression) form the rest of the input/output filter. The EMI tri-windings are like polled and structured on a ferrite core to function as a low loss transmission line for balanced signals and as a choke for common mode signals. Undesirable common mode signals are "choked" for lower frequencies 10 to 30 megahertz. Above that range, the partially floating winding traps and couples this signal into resistors 14 or 15 for dissipation. In this way, a common mode filter is achieved which is effective over a 10 megahertz to 200 megahertz band. the functional characteristics of these transformers are shown in FIG. 5.

The equalizing network in the receiver is to equalize the signals due to different lengths of transmission cable. The shielded twisted pair cable has high frequency losses which, in turn, contribute to its low pass filtering. Moreover, it is proportional to its length so that at maximum length, it is at its lowest frequency. A single high frequency peaking equalizer can be used to compensate effectively at a single length and hence, it is set to a maximum length of 100 meters. If the performance can be met at 100 meters, the overall compensation for shorter length can be tolerated because of the ECL response characteristics. In the transmitter section of the transceiver, the equalizer (FIG. 3), is combined with the transmit attenuator capacitor. Furthermore, since the transmit output circuitry plus cable to the input of the amplifier are linear elements, then this equalizer can be placed just as well at a receiver input. The advantage is that a well defined square transmit pulse can be defined and standardized easily. The equalizer in the receiver portion of the transceiver is formed from a circuit similar to that of the transmit attenuator equalizer resistive network.

Robust design dictates protection from surges in over voltage on the signal lines. A plurality of diode CR6, CR5, CR7 and CR8 and transformer T2A are used to protect the receiver circuit from over-current over-voltage damage. Similarly, in the transmit portion of the transceiver, diodes CR1, CR2, CR3 and CR4 and transfromer T1A protect the transceiver.

Figure 6:
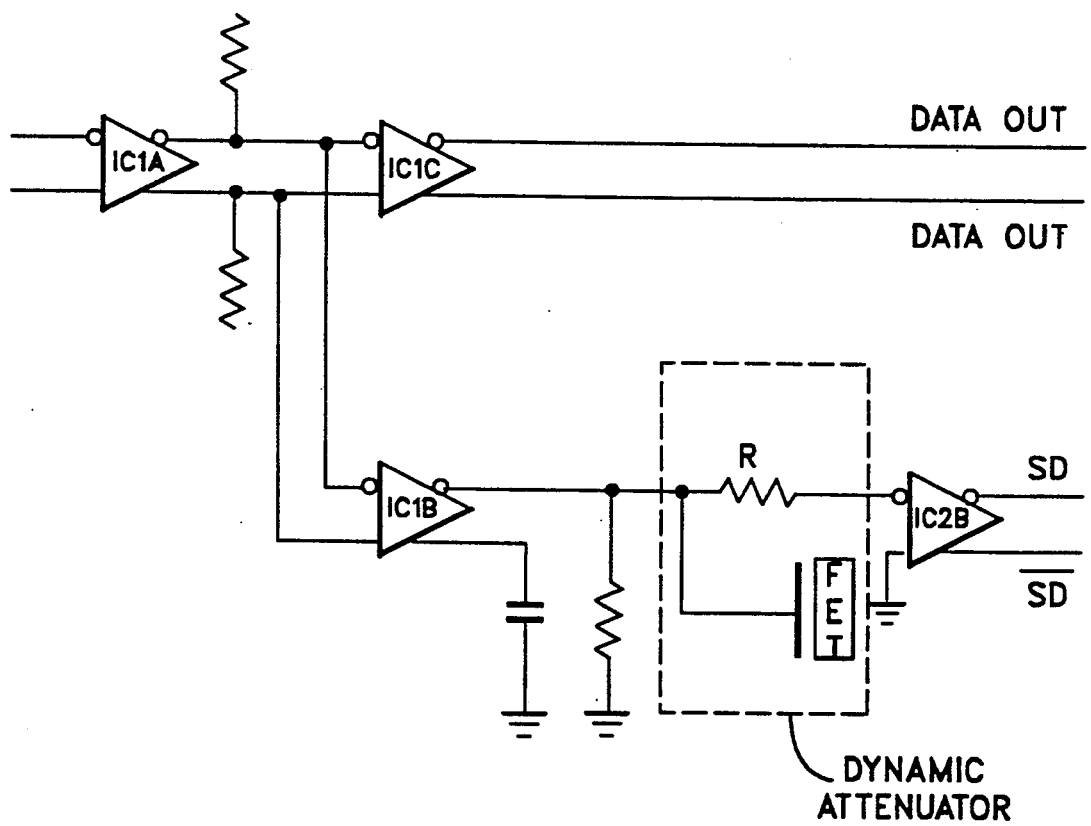
FIG. 6 shows a schematic representation of a dynamic thresholding circuit.

The SD attenuator described above is a fixed attenuator. In some applications, variable adaptive thresholding can be very useful and is an improvement over the fixed version described earlier. FIG. 6 shows a circuit schematic of an adaptive thresholding attenuator. The ECL modules are similar to those in FIG. 3 and are identified by the same alpha numeric characters. The dynamic attenuator comprises an FET linear switch connected to a resistor R. If the SD attenuator in FIG. 3 is replaced with that of FIG. 6, adaptive thresholding results. It is accomplished by coupling the signal detect signal through a dynamic attenuator which, itself, is controlled by the rectified received data signal.

The dynamic attenuator (the FET linear switch) attenuates large signals greater than small signals and the net effect is to provide a valid signal detect (SD output) which moves with the average DC value of the received signal. This is an average received signal (after amplifier) is 0.2 volts for long cables or 1 volt for short cables. The SD will adjust accordingly. Hence, long cables will have a low threshold and short cables, a higher threshold. This is very desirable because in most installations, most of the office wiring is at half the maximum allowable distance. Consequently, threshold level will always be at optimum value and thus offering best signal to noise (S/N) ratio.

The benefits enuring from the use of this invention are:

A simplex high speed circuit which optimally uses reduced signal levels, wideband common mode filtering, cable equalization and surge protection to achieve robustness and superior signal transmission performance with EMI compliance.

I claim:

1. An improved communications system for transporting high speed data signals comprising:
   a fiber optic backbone network including fiber optic transmission lines;
   a wire distribution network including wire transmission lines; and
   a concentrator means for interfacing the backbone network with the distribution network; said concentrator means including a first means for receiving optical signals from the backbone network and converting said optical signals into electrical signals;
   a transceiver module having a transmit section with a second means for receiving and balancing the electrical signals, filtering unbalanced signal components from said electrical signals and transmitting balanced electrical signals onto the wire transmission lines.

2. The improved communications system of claim 1 wherein the second means includes a common mode transformer having a core with windings thereon; said common mode transformer attenuating common mode signal components while passing fast rise time pulses in order to preserve very high data rates with minimum radiation.

3. The improved communications system of claim 2 wherein the second means further includes a transmit attenuation means with its output coupled to an input side of said common mode transformer, said transmit attenuation means receiving the electrical signals and attenuating said electrical signals to a predetermined level to reduce radiation; and
   an emitter coupled logic (ECL) means coupled to an input side of said transmit attenuation means, said ECL means receiving the electrical signals and processing said signals by standardizing the switching speed and output levels of said electrical signals.

4. The improved communications system of claim 1 wherein the transceiver module further includes
   a receiver section for coupling the wire distribution network to the fiber optic backbone network; said receiver section including third means for receiving electrical signals from the wire distribution network, balancing the electrical signals and filtering common mode signal components from said electrical signals, an equalizer means for equalizing the electrical signals to compensate for different cable lengths, and amplifying means for amplifying the electrical signals and delivering said electrical signals to selected output pins on said transceiver.

5. The improved communications system of claim 4 wherein the third means includes a common mode transformer having windings that filter common mode signals and passes fast rise time pulses; and
   a terminating network coupled to an input side of said transformer.

6. The improved communications system of claim 4 further including a thresholding circuit means coupled to the amplifying means, said thresholding circuit means operable to sample the electrical signals outputted from the amplifying means and generating therefrom control pulses indicating that the magnitude of the electrical signals is within a predetermined range.

7. The improved communications system of claim 4 further including a fourth means coupled to the amplifying means for converting electrical signals into optical signals which are outputted on the fiber optic backbone network.

8. The improved communications system of claim 5 further including a protective network means for protecting against high voltage/high current transients coupled to an output side of said transformer.

9. The improved communications system of claim 8 wherein the protective network means includes a transformer, and a diode network connected to said transformer.

10. The improved communications system of claim 8 further including an emitter coupled logic (ECL) means for amplifying and restoring said electrical signals to ECL predetermined signal levels and switching speeds coupled to the amplifying means.

11. An improved circuit arrangement for use within a communication network comprising:

a transmitting section and a receiving section packaged within a single housing;

said transmitting section including (a) an ECL logic means for receiving high speed data signals and processing the high speed data signals by standardizing output levels and switching speeds of said high speed data signals;

(b) an attenuator means coupled to the ECL logic means; said attenuator means operable to receive the high speed data signals from said ECL logic means and to attenuate the amplitude of said signals to a predetermined level which is optimally set to provide both EMI compliance and superior signal transmission over the cable and (c) an output filtering means for receiving the high speed data signals, suppressing common mode signal components and passing fast rise time pulses;

said receiving section including (d) an input filtering means for receiving high speed data signals; suppressing common mode components in said high speed data signals and passing fast time rise pulses;

(e) an equalizing circuit means coupled to an output side of said input filtering means; said equalizing circuit means receiving high speed data signals and equalizing said high speed data signals to compensate for different cable lengths, and cable frequency distortions, and (f) an amplifying means coupled to an output side of said equalizing circuit means; said amplifying means receiving high speed data signals from said equalizing circuit means, amplifying and forwarding said high speed data signals.

12. The improved circuit arrangement of claim 11 further including a protective circuit means disposed between the attenuator means and the output filtering means; said protective circuit means protecting against high voltage/high current transients.

13. The improved circuit arrangement of claim 11 further including a connector for receiving and transmitting electrical signals from and to a transmission cable;

a first length of transmission media interconnecting the connector and the output filtering means; and a second length of transmission media interconnecting the connector with the input filtering means.

14. The improved circuit arrangement of Claim 13 wherein the connector is a D shell connector.

15. The improved circuit arrangement of claim 14 wherein the first and second length of transmission media are twisted pair copper wire.

16. The improved circuit arrangement of claim 11 further including a terminating network interconnecting an input side of said filtering means with a ground potential.

17. The improved circuit arrangement of claim 16 further including a protective network disposed between an output side of said input filtering means and the equalizing means, said protective network preventing high voltage/high current transients from damaging the receiving section.

18. The improved circuit arrangement of claim 17 further including a thresholding circuit means coupled to the amplifying means; said thresholding circuits means monitoring the data signals outputted from said amplifying means and outputting a control signal only if the data signals are valid.

19. The improved circuit arrangement of claim 18 wherein the thresholding circuit means includes an attenuator network;

a rectifying network coupled to the attenuator network; and a clipper network coupled to the attenuator network.

20. A circuit arrangement for use in the transmitter section of a transceiver, said circuit arrangement including (a) an ECL logic means for receiving high speed data signals and processing the high speed data signals by standardizing output levels and switching speeds of said high speed data signals;

(b) an attenuator means coupled to the ECL logic means; said attenuator means operable to receive the high speed data signals from said ECL logic means and to attenuate the amplitude of said signals to a predetermined level which optimally satisfies superior signal transmission and EMI compliance; and (c) an output filtering means for receiving the high speed data signals, suppressing common mode signal components and passing fast rise time pulses.

21. A circuit arrangement for use in the receiver section of a transceiver comprising:

(a) an input filtering means for receiving high speed data signal, suppressing common mode components in said high speed data signals and passing fast time rise pulses;

(b) an equalizing circuit means coupled to an output side of said input filtering means; said equalizing circuit means receiving high speed data signals and equalizing said signal to compensate for different cable lengths; and (c) an amplifying means coupled to an output side of said equalizer means; said amplifying means receiving high speed data signals from said equalizing means, amplifying and forwarding said high speed data signals.

22. A concentrator for interconnecting a FDDI communications network and a wire communications network comprising:

a first optical converter means for receiving optical signals from the FDDI communications network, and converting said optical signals into electrical signals;

at least one transceiver means coupled to the first optical converter means; said at least one transceiver means including a transmitting section and a receiving section;

said transmitting section including (a) an ELC logic means for receiving high speed data signals and processing the high speed data signals by standardizing output levels and switching speeds of said high speed data signals;
(b) an attenuator means coupled to the ECL logic means; said attenuator means operable to receive the high speed data signals from said ECL logic means and to attenuate the amplitude of said signals to a predetermined level which is optimally set to provide both EMI compliance and superior signal transmission over the cable and
(c) an output filtering means for receiving the high speed data signals, suppressing common mode signal components and passing fast rise time pulses;

said receiving section including
(d) an input filtering means for receiving high speed data signals, suppressing common mode components in said high speed data signals and passing fast time rise pulses;
(e) an equalizing circuit means coupled to an output side of said input filtering means; said equalizing circuit means receiving high speed data signals and equalizing said high speed data signals to compensate for different cable lengths, and cable frequency distortions;
(f) an amplifying circuit means coupled to an output side of said equalizing circuit means; said amplifying circuit means receiving high speed data signals from said equalizing circuit means, amplifying and forwarding said high speed data signals; and a second optical converter means for receiving electrical signals from said receiving section converting said electrical signals into optical signals which is transmitted onto the FDDI communications network.

* * * * *